United States Patent
Jones (10) Patent No.: US 7,533,159 B1
(45) Date of Patent: May 12, 2009

(54) SELECTIVE FLOODING IN A MULTICAST NETWORK

(75) Inventor: Peter Geoffrey Jones, Campbell, CA (US)

(73) Assignee: ADTRAN Inc., Huntsville, AL (US)

( * ) Notice: Subject to any disclaimer, the term of this patent is extended or adjusted under 35 U.S.C. 154(b) by 547 days.

(21) Appl. No.: 10/232,488

(22) Filed: Aug. 30, 2002

(51) Int. Cl.
*G06F 15/16* (2006.01)

(52) U.S. Cl. ......................... 709/220; 709/221; 709/222; 709/249; 709/250; 713/1; 713/2; 713/100

(58) Field of Classification Search ................. 709/220, 709/221, 222, 249, 250; 713/1, 2, 100
See application file for complete search history.

(56) References Cited

U.S. PATENT DOCUMENTS

| | | | | |
|---|---|---|---|---|
| 5,557,748 | A * | 9/1996 | Norris | 709/220 |
| 5,953,507 | A * | 9/1999 | Cheung et al. | 709/250 |
| 6,023,563 | A * | 2/2000 | Shani | 709/249 |
| 2003/0130832 | A1 * | 7/2003 | Schulter et al. | 703/23 |
| 2003/0130833 | A1 * | 7/2003 | Brownell et al. | 703/23 |

OTHER PUBLICATIONS

IEEE Std 802.3, 2000 Edition, "Part 3: Carrier sense multiple access with collision detection (CSMA/CD) access method and physical layer specifications," Oct. 16, 2000, pp. 14, 488-489, 698-744, 801-804, 868-869, 873-876, 931-932, 1009-1032, 1125-1129.
Maximum Linux Security, "Part III—Linux Network Security, Chapter 7—Sniffers and Electronic Eavesdropping," Sep. 1999, pp. 1-4.
Daiji Sanai, "Detection of Promiscuous Nodes Using ARP Packets," Version 1.0, Aug. 31, 2001, pp. 1-13.
SecuriTeam.com, "Detecting sniffers on your network," Sep. 15, 2000, pp. 1-2.

* cited by examiner

*Primary Examiner*—Jinsong Hu
(74) *Attorney, Agent, or Firm*—Sawyer Law Group LLP (57) ABSTRACT

A system and method for selective flooding in a multicast network are disclosed. Some embodiments provide for a promiscuous mode device on a network to signal to one or more other devices on the network that the promiscuous mode device is operating in promiscuous mode. In response to such a signal, one or more devices on the network dynamically cease operating in non-broadcast mode and dynamically commence operating in broadcast mode to ensure that the promiscuous mode device sees all data transmissions on the network or sub-network.

22 Claims, 6 Drawing Sheets

SELECTIVE FLOODING IN A MULTICAST NETWORK

TECHNICAL FIELD

The present invention relates to data networks and in particular to selective flooding in a multicast network, such as a local area network (LAN), a metropolitan area network (MAN), or a wide area network (WAN).

BACKGROUND

A Local Area Network (LAN) is a communications network that typically serves users within a confined geographical area. The LAN is usually made up of servers, workstations, a network operating system, and communications links. In some LAN configurations, a bridge device may be inserted into a LAN to segment the LAN into multiple sub-networks. The bridge then maintains network traffic between devices on one sub-network contained within that sub-network to improve performance. Bridges typically build and maintain address tables of the devices on each sub-network. By monitoring which stations transmit from a particular address, a bridge learns which stations are attached to each sub-network. Sub-networks are sometimes referred to as "subnets" or "LAN segments."

In general, bridges function based on the assumption that the bridge sees all transmitted data packets, on a given network or sub-network. Bridges typically operate in promiscuous mode, which may be defined as a condition, or mode, in which a network device accepts all packets on the network media of a certain protocol type, regardless of intended destination or destinations.

It is desirable that promiscuous mode devices see all data transmissions on a given network or sub-network in order to properly perform their respective functions. Examples of promiscuous mode devices include, but are not limited to, bridges, network monitors, protocol analyzers, RMON (Remote Network Monitoring) probes, and other network devices that accept all packets of a certain protocol type on the network media, regardless of intended destination or destinations.

For example, if the function of a network monitor device is to record all data packets on the network or sub-network then it is desirable, or necessary, for the network monitor device to see all data packets on the network or sub-network. Similarly, a learning bridge builds address tables based on inspection of data packets traversing the network or sub-network. If the learning bridge does not see all data packets traversing the network, the ability of the learning bridge to build address tables is impaired, which may result in unnecessary flooding of data packets to other, connected sub-networks. Hence, it is important for many applications that promiscuous mode devices see all data packets traversing the network or sub-network.

Some traditional LANs operate by broadcasting all data transmissions to all devices on a sub-network. That is, all devices on such a sub-network receive all data packets transmitted on the sub-network. Examples of this type of LAN include LANs pursuant to IEEE 802.3, 802.5, traditional Ethernet, and the like. In sub-networks such as these, a physical media delivers all data packets transmitted by a device on the sub-network to all devices on the sub-network. Each device on the sub-network then determines whether to process any given packet, based on, for example, the destination address of the packet. Promiscuous mode devices, however, process all received packets.

Figure 1:
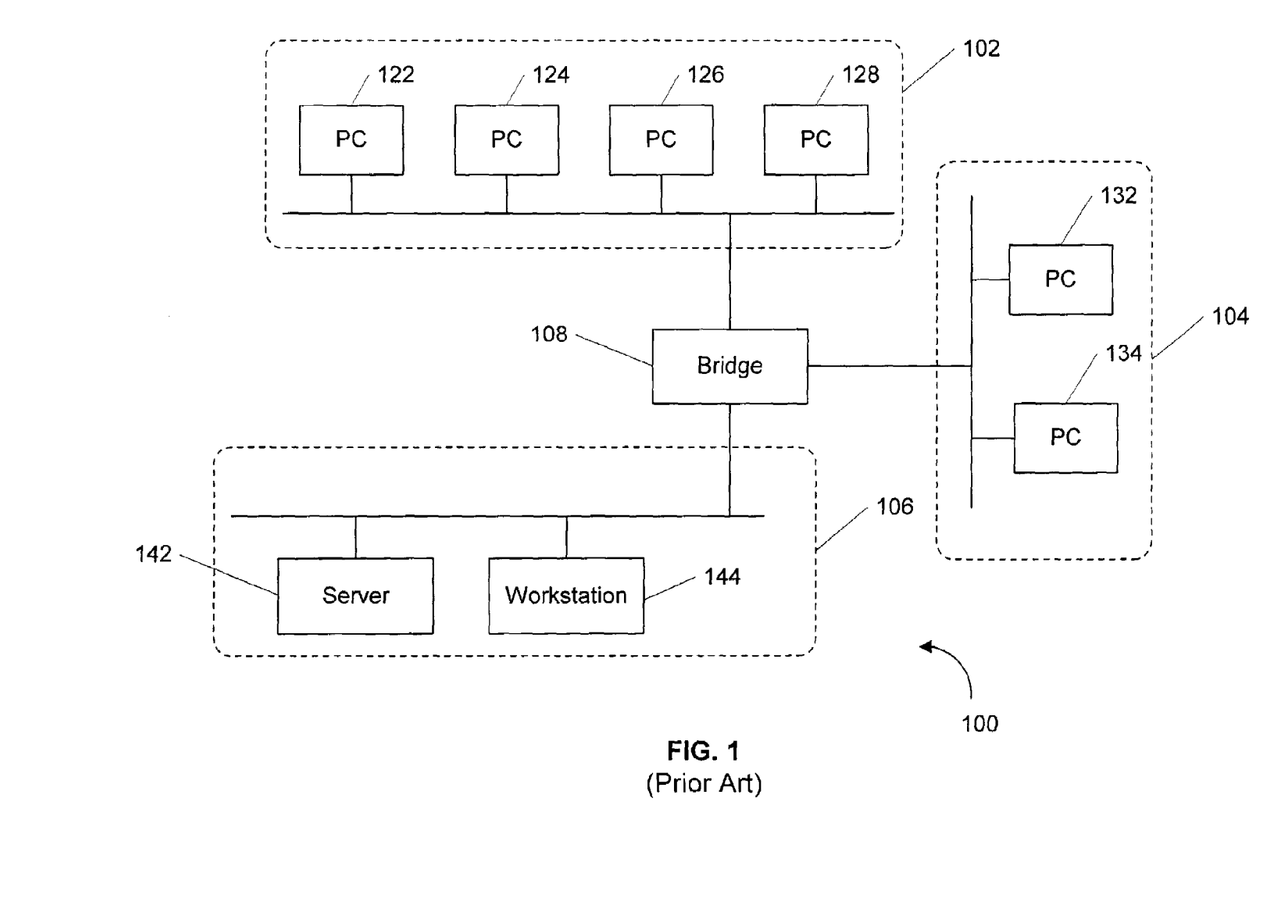
FIG. 1 illustrates a bridge in a conventional broadcast network.

For example, FIG. 1 illustrates a conventional broadcast network 100, such as a network pursuant to IEEE 802.3, including sub-networks 102, 104, 106. A bridge 108 separates the sub-networks 102, 104, and 106. The sub-network 102 includes personal computers 122, 124, 126, and 128. The sub-network 104 includes personal computers 132, 134. The sub-network 106 includes a server 142 and a workstation 144.

In this configuration, the bridge 108 is set to operate in promiscuous mode and sees and processes all data packets sent on the sub-networks 102, 104, and 106. As such, the bridge 108 is able to populate learning tables (not shown) associated with the bridge 108 based on all of the traffic that passes between any of the devices on the network 100. For example, if workstation 144 and server 142 exchange data packets the bridge 108 updates its learning tables to indicate that the server 142 and workstation 144 are on the sub-network 106. Later, when personal computer 122 sends a data packet to the server 142, the bridge 108, using associated learning tables, forwards the data packet from sub-network 102 to sub-network 106, without forwarding the data packet to sub-network 104, such as by flooding. Thus, the bridge 108 improves the efficiency of the network 100 by not unnecessarily forwarding data packets onto sub-networks that do not include the destination device.

Advances in technology, however, have resulted in the development of LANs, MANs, and WANs where data transmissions, such as data packets, are multicast to fewer than all of the devices on the network or sub-network. One example of this type of network is a network pursuant to IEEE Draft P802.17/D1.0 Resilient Packet Ring (RPR) Aug. 12, 2002, which is hereby incorporated by reference and discloses spatial reuse. Spatial reuse employs a function referred to as destination stripping where a destination device removes from the network media data transmissions addressed to the destination device. This results in the difficulty that a bridge device, network monitor, or other promiscuous mode device, will see only a subset, rather than all, of the data transmissions on a network or sub-network. Thus, if a promiscuous mode device is downstream of the destination device of a given packet, the promiscuous mode device will not see the packet. This is because the destination device will remove the packet from the network media before the packet reaches the promiscuous mode device, thereby limiting the ability of the promiscuous mode device to perform its function.

Other types of networks in which data packets are sometimes transmitted to fewer than all devices on the network or sub-network include, for example, switched Ethernet networks, wireless networks pursuant to IEEE 802.11, passive optical networks pursuant to IEEE 802.3ah, and the like.

Therefore, if a network device in a multicast network operates in promiscuous mode, the ability of the network device operating in promiscuous mode to function properly may be impaired or frustrated by not seeing all data packets that traverse the associated network or sub-network.

SUMMARY

A need exists therefore for a system and method for determining that a network device on a non-broadcast network is operating in promiscuous mode. An additional need exists to provide a system and method for dynamically reconfiguring at least one device on the network to operate in a broadcast mode to ensure that the promiscuous mode device or devices see all data transmissions on the network in response to making that determination.

In a network or sub-network that has the ability to be multicast, such as in a destination stripping network, devices on the network signal to each other when they are in promiscuous mode. Upon receipt of a signal, or message, that a device on the network or sub-network is in promiscuous mode, at least one of the devices on the network commences operating in a broadcast mode and ceases to send data transmissions to fewer than all of the devices on the network or sub-network. This ensures that the promiscuous mode device on the network sees all traffic traversing the network or sub-network.

Pursuant to one embodiment, a method for configuring a network includes initially multicasting data transmissions over the network. Upon receiving a message over the network indicating that at least one device on the network is operating in promiscuous mode, the network devices cease to multicast data transmissions on the network to fewer than all of the devices on the network in response to receiving the message. The device also begins broadcasting data transmissions on the network in response to receiving the message.

According to another embodiment, a network device determines that it is operating in promiscuous mode and transmits a message on the network that indicates that it is operating in promiscuous mode. This message may, in some embodiments, comprise a link layer protocol message indicating that the transmitting device is operating in promiscuous mode. Other network devices receive the message and, in response to receiving the message, cease operating in a multicast or unicast mode and commence operating in a broadcast mode by transmitting subsequent data transmissions to all devices on the network rather than to a subset of all devices on the network.

In one embodiment, when a network device enters broadcast mode, the network device ceases to perform destination stripping. That is, the destination network device does not remove the data packets from the network media that are destined for the destination network device. Rather, the destination network device permits all data packets to continue traversing the network regardless of the destination addresses of the data packet.

Likewise, a multicast network operating in broadcast mode due to the presence of one or more promiscuous mode devices on the network may begin or resume operating in multicast mode when the one or more promiscuous mode devices are shut down or otherwise removed from the network. Such a multicast network operating in broadcast mode may also begin or resume operating in non-broadcast mode when the one or more promiscuous mode devices are no longer are functioning in promiscuous mode.

In one embodiment, the devices on the network begin or resume operating in multicast mode and cease operating in broadcast mode when they do not receive any data packets from the promiscuous mode device or devices within a predetermined amount of time. In another embodiment, the one or more devices previously operating in promiscuous mode each transmit a message indicating that they are not operating in promiscuous mode. Upon receipt of such a message, the network devices begin or resume operation in multicast mode by sending data transmissions to fewer than all devices on the network.

These and other details regarding embodiments of the invention may be further understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
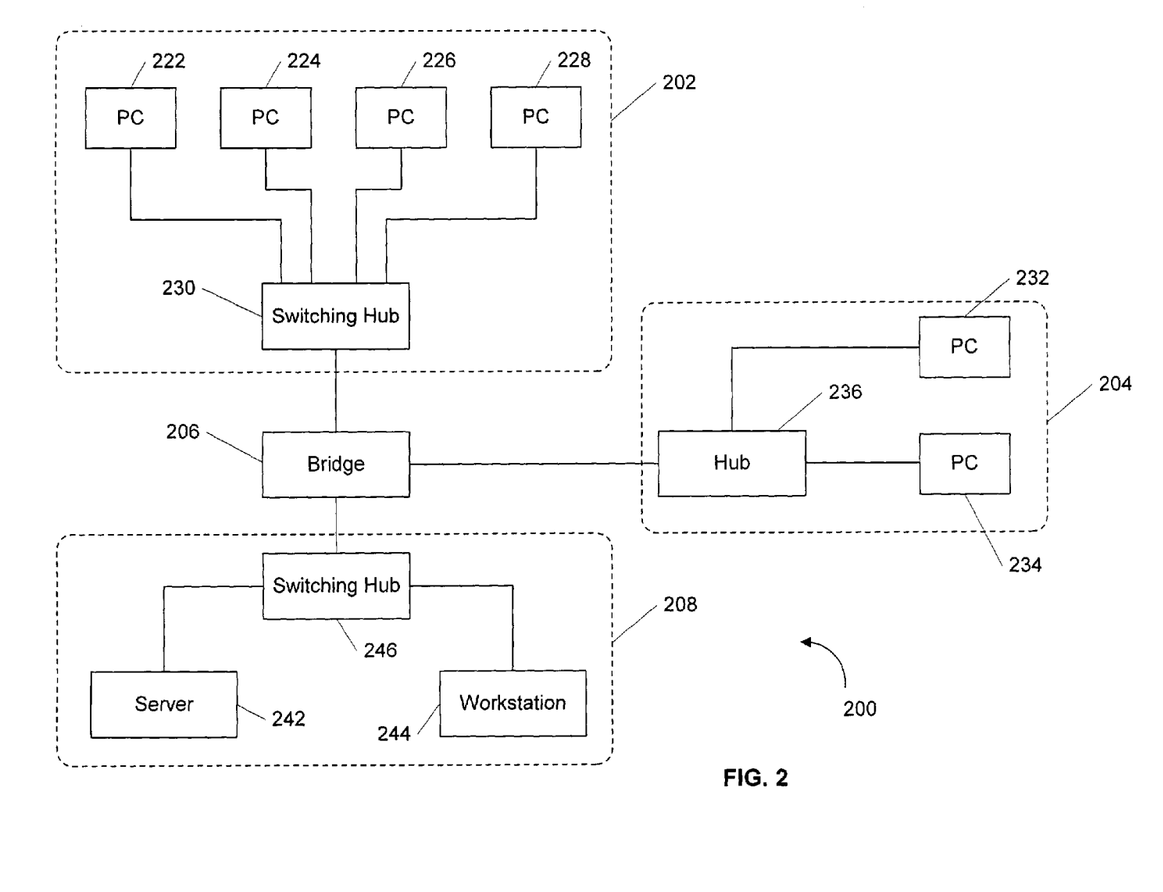
FIG. 2 illustrates a bridge in a multicast network, in accordance with one embodiment of the present invention.

FIG. 2 illustrates a multicast network 200, which comprises a hub-based IEEE 802.3 twisted pair network and includes sub-networks 202, 204, 208 connected by a bridge 206. The sub-network 202 includes personal computers 222, 224, 226, 228, connected to a switching hub 230 at separate ports thereof. The sub-network 204 includes personal computers 232, 234, each connected to separate ports of a non-switching hub 236. The sub-network 208 includes a server 242 and a workstation 244 connected to separate ports of a switching hub 246. The switching hubs 230, the switching hub 246, and the non-switching 236 are each connected to separate ports of the bridge 206, the bridge 206 comprising a promiscuous mode device. As those skilled in the art will appreciate, a switching hub functions substantially as a bridge, whereas a non-switching hub functions substantially as a relay.

In this configuration, the switching hubs 230, 246 perform a switching function in that the switching hubs 230, 246 operate substantially as a basic bridge and filter traffic between ports so that each switching hub 230, 246 sends traffic to only a subset of its ports. The non-switching hub 236, in contrast with the switching hubs 230, 246, does not perform a switching or filtering function, but rather sends traffic entering one of its ports to all of its ports.

Use of switching hubs 230, 246 may improve network performance and more efficiently use the available bandwidth of the network 200 in that this configuration permits multiple independent transactions to occur simultaneously. For example, in the network 200, personal computer 222 may send a data packet to personal computer 224 simultaneously with personal computer 226 sending a data packet to personal computer 228. The switching hub 230 sees the data packet transmissions between personal computers 222 and 224 as well as the data packet transmissions between personal computers 226 and 228, but does not flood, or transmit either of these transactions to the bridge 206.

Hence, the sub-network 202 may be referred to as a multicast sub-network because not all data packets are presented, or transmitted, to all stations. Thus, a single data transmission may reach multiple, but not all, stations on a sub-network by virtue of the action of the switching hub 203 not flooding or transmitting data packet transmissions between devices on the sub-network 202 to the bridge 206.

Pursuant to the configuration of the sub-network 202, greater throughput of data transmissions between stations may occur because data packets that are not destined for outside of the sub-network 202 are not transmitted to the bridge 206.

A problem exists, therefore, because the bridge 206, in its normal mode of operation, operates in promiscuous mode and, therefore, in order to function properly, needs to see and process all packets on the network 200, regardless of the protocol type or intended destination or destinations.

In accordance with one embodiment of the present invention, the bridge 206, operating in promiscuous mode, transmits a promiscuous mode indication to all network devices directly coupled thereto (i.e., the switching hubs 230, 246 and the non-switching hub 236). A "promiscuous mode indication" comprises a data transmission, such as a data packet that includes an indication that the sender, or source of, the data transmission is operating in promiscuous mode.

The promiscuous mode indication may be transmitted to the switching hubs 230, 246 and the non-switching hub 236 pursuant to a link layer protocol, such as a discovery or management protocol, associated with the underlying network. Many link layer protocols include reserved, or unused, fields that may be used by the bridge 206 to indicate to devices coupled thereto that the bridge 206 is operating in promiscuous mode. Thus, by using one of the reserved, or unused, fields in a link layer protocol transmission, a link layer protocol data transmission may comprise a promiscuous mode indication when the link layer discovery protocol data transmission includes an indication that the transmitting device is operating in promiscuous mode.

The promiscuous mode indication, in the example of FIG. 2, is received at the switching hubs 230, 246, and the non-switching hub 236. In response to receiving the promiscuous mode indication the switching hub 230 stops operating in a multicast mode and begins operating in a broadcast mode and commences to flood the bridge 206 with all packets on the sub-network 202, regardless of the destination addresses of the packets. Thus, after receiving the promiscuous mode indication sent by the bridge 206 to the switching hub 230, the switching hub 230 forwards data transmissions between devices on the sub-network 202 (e.g., transmissions between devices 222 and 224 or between devices 224 and 228) to the bridge 206.

Specifically, in one embodiment, after receiving the promiscuous mode indication sent by the bridge 206 to the switching hub 230, the switching hub 230 dynamically reconfigures its bridging, or packet forwarding, function to operate in a broadcast, rather than in a multicast, mode. In particular, the switching hub 230 reconfigures its bridging, or packet forwarding, function from a switching function to a flooding function. Hence, in response to the switching hub 230 receiving the promiscuous mode indication sent by the bridge 206, the switching hub 230 reverts to operating in basic hub, or relay, mode, whereby the switching hub 230 floods received packets to all ports of the switching hub 230, except the port at which the given packet is received. Accordingly, the switching hub 230, when operating in broadcast mode, transmits all packets on the sub-network 202 to the bridge 206, or other device connected thereto.

The switching hub 246, like the switching hub 230, after receiving the promiscuous mode indication sent by the bridge 206 reconfigures its MAC layer to operate in a broadcast, rather than in a multicast, mode. Hence, the switching hub 246, when operating in broadcast mode, transmits all packets on the sub-network 204 to the bridge 206, or other promiscuous device positioned at the network position of the bridge 206.

The non-switching hub 236 operates in broadcast mode regardless of whether the non-switching hub 236 receives the promiscuous mode indication sent by the bridge 206. Thus, the non-switching hub 236 transmits all packets received from either of the personal computers 232, 234 to the bridge 206.

Accordingly, by transmitting the promiscuous mode indication onto the network 200, the bridge 206 notifies network devices that a promiscuous mode device is connected to the network 200. In response to receiving the promiscuous mode indication, network devices, such as the switching hubs 230, 246, cease to operate in a multicast mode. These network devices then begin operating in a broadcast mode, whereby the network devices begin to broadcast all data transmissions over the network, regardless of the destination address of the data transmission. Broadcasting all data transmissions over the network regardless of destination address may limit or reduce the bandwidth and efficiency of the network 200. Broadcasting all data transmissions over the network regardless of destination address, however, ensures that the bridge 206, or other promiscuous mode device, will receive all data transmissions on the network 200 and will therefore be able to carry out its functions.

When the bridge 206 undergoes a configuration change from promiscuous mode to non-promiscuous mode, the bridge 206 (no longer functioning as a bridge) transmits a non-promiscuous mode indication to devices on the network 200. The bridge 206 may transmit the non-promiscuous mode indication in a manner similar to the transmission of the promiscuous mode indication described above. The difference between the non-promiscuous mode indication and the promiscuous mode indication is that the non-promiscuous mode indication indicates that the device transmitting the non-promiscuous mode indication is not operating in promiscuous mode or is operating in non-promiscuous mode.

Accordingly, when the switching hub 230 receives a non-promiscuous mode indication from the bridge 206, the switching hub 230 determines that the bridge 206 previously sent a promiscuous mode indication. If the switching hub 203 has not received a promiscuous mode indication from another device on the network, the switching hub 230 ceases to operate in broadcast mode and returns operating in multicast mode as a switching hub. Optionally, if the switching hub 230 does not receive data transmission from the bridge 206 for a predetermined amount of time, the switching hub 230 ceases to operate in broadcast mode and returns operating in multicast mode as a switching hub. The switching hub 246 operates in a manner similar to the switching hub 230.

Figure 3:
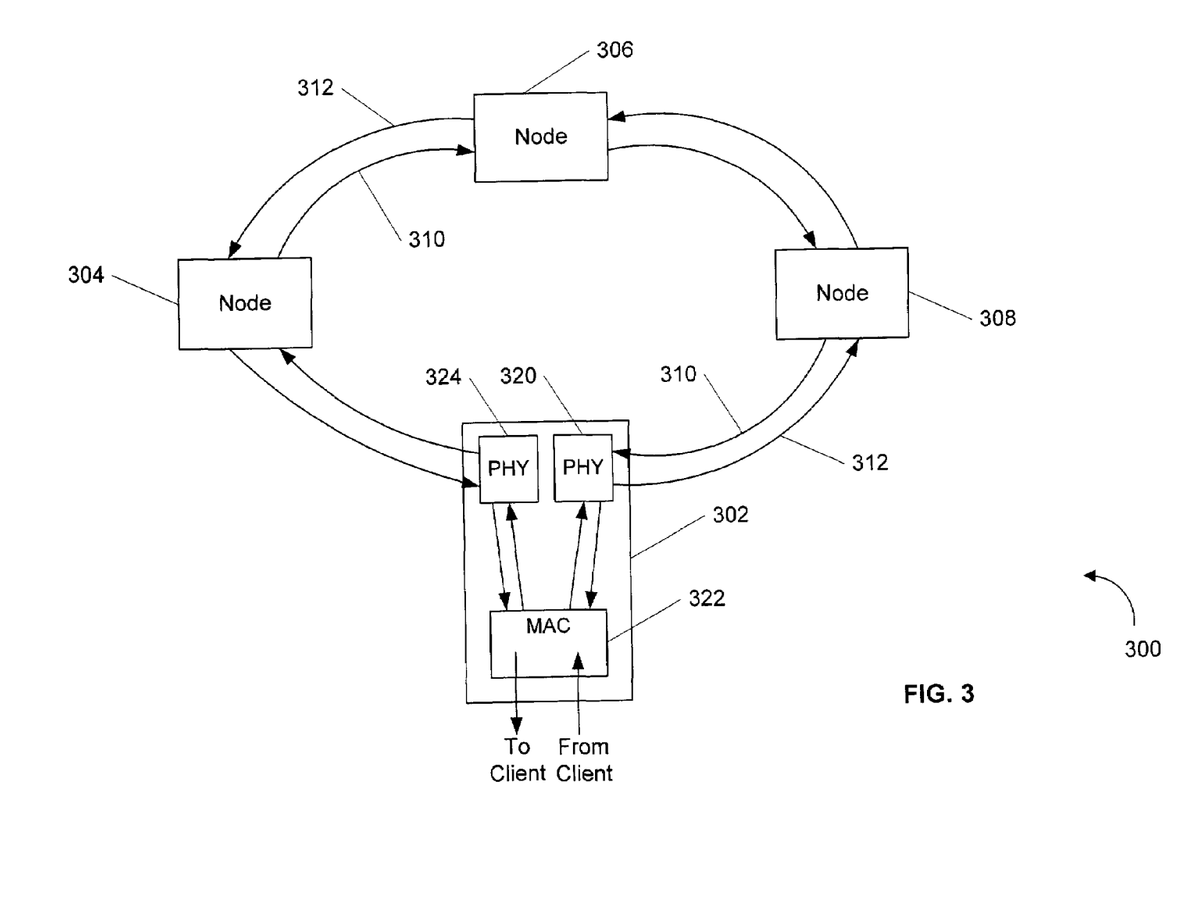
FIG. 3 illustrates a resilient packet ring network, in accordance with one embodiment of the present invention.

FIG. 3 illustrates an example Resilient Packet Ring (RPR) network 300, such as in accordance with the above-referenced IEEE 802.17 draft standard, and includes nodes 302, 304, 306, and 308. The nodes 302-308 may also be referred to as "stations." Each of the nodes 302-308 is a point on the network 300 where traffic can enter or exit the network 300. The nodes 302-308 may each comprise a packet forwarding device such as the routing switch described in U.S. patent application Ser. No. 09/518,792, the disclosure of which is hereby incorporated by reference. The network 300 also includes ringlets 310 and 312. The ringlet 310 comprises a set of links and transmits data in a clockwise direction and the ringlet 312 also comprises a set of links and transmits data in a counterclockwise direction. The ringlets 310 and 312 may be collectively referred to as a "ring."

In multicast mode, the destination node of a data packet removes the data packet from the ring. The functionality of having the destination node of a data packet remove the data packet from the network may be referred to as "destination stripping" to provide "spatial reuse." Destination stripping is useful in improving bandwidth efficiency by not transmitting a data packet past, or beyond, the destination of the data packet.

For example, in multicast mode, if a data packet were sent from node 306 to node 302 on ringlet 310, the data packet would first be sent from node 306 to node 308. Node 308 would not remove the data packet from the ringlet 310 because the node 308 is not the destination node. Node 308, instead, transmits the data packet to node 302, which would remove the data packet from the ringlet 310. In particular, a physical layer 320 of the node 302 receives the data packet from the ringlet 310 and passes the data packet to the MAC layer 322 of the node 302. If the MAC layer 322 determines that the node 302 is the destination node of the data packet, the MAC layer 322 removes the data packet from the ringlet 310 and passes the data packet to an associated client (not shown). If the MAC layer 322 were to determine, that the node 302 is not the destination node of the data packet, the MAC layer 322 would pass the data packet to the physical layer 324 of the node 302 and forward the data packet over the ringlet 310 to the node 304.

A problem exists if the node 304 is a promiscuous mode device and the nodes 302, 306, and 308 are operating in non-broadcast mode and are performing destination stripping. In this situation, the node 304 would not see a data packet sent from node 306 to the node 302 along the ringlet 310 due to destination stripping. This is because the node 302, being the destination node, would remove the data packet from the ringlet 310 before the node 304 receives the data packet. In this situation, if the node 304 were operating in promiscuous mode, the ability of the node 304 to perform its functions would be limited by not receiving all data packets on the network 300.

Pursuant to one embodiment of the present invention, therefore, a promiscuous mode device, such as the node 304, transmits a promiscuous mode indication to the other nodes on the network 300. The promiscuous mode indication may comprise a link layer message, as discussed above. In an example embodiment, the promiscuous mode indication comprises a topology status packet pursuant to IEEE 802.17, having a bit that designates whether the source device, or sender, of the topology status packet is operating in promiscuous mode.

In response to receiving a promiscuous mode indication sent by the node 304, the nodes 302, 306, and 308 cease operating in multicast mode and commence operating in broadcast mode. Specifically, each node 302, 306, and 308 ceases to perform destination stripping such that the destination node of a data packet does not remove the data packet from the ring, but rather merely makes a copy of the data packet and permits the data packet to continue traversing the ring. In broadcast mode, each of the nodes performs source stripping where the source node of a transmitted packet removes the transmitted packet from the network. Thus, using source stripping, each data packet circulates the entire ring until the data packet is received and removed by the sender, or source, of the data packet.

For example, with reference to node 302, upon receiving a promiscuous mode indication from the node 304, the node 302 dynamically reconfigures the MAC layer 322 to cease destination stripping. Thus, rather than removing packets destined for the node 302 from the network 300, the MAC layer 322 makes a copy of such packets and forwards the copy to the associated client (not shown) and permits such packets to resume traversing the network 300. Ceasing destination stripping permits the network 300 to function as a broadcast network with the MAC layer of each of the nodes 302-308 operating in broadcast mode.

In broadcast mode, the MAC layer of each of the nodes 302-308 may perform source stripping where the source node of a transmitted packet removes the transmitted packet from the network 300. Thus, using source stripping, each data packet circulates the entire ring, following either ringlet 310 or ringlet 312 until the data packet is removed by the sender, or source, of the data packet. Thus, even if the source and destination nodes are physically very close to each other on the ringlets 310, 312, data packets traverse the entire ring until they return to the source node to be removed. This permits a promiscuous mode node, such as the node 304, to see all data packets transmitted on the network 300.

When a node on the network 300 is configured or reconfigured to operate in non-promiscuous mode, the node transmits a non-promiscuous mode indication to the other nodes on the network 300 to signal that the transmitting node is not operating in, or no longer operating in, promiscuous mode. This non-promiscuous mode indication may comprise a topology status packet with a bit set to indicate that the transmitting node is not operating in promiscuous mode.

Accordingly, when the node 302 receives a non-promiscuous mode indication from the node 304, the node 302 determines that the node 304 previously sent a promiscuous mode indication. If the node 302 has not received a promiscuous mode indication from another device on the network, the node 302 ceases to operate in broadcast mode and returns to operating in multicast mode and reverts to performing destination stripping at the MAC layer 322. Optionally, if the node 302 does not receive a promiscuous mode indication from any node on the network 300 for a predetermined amount of time, the node 302 ceases to operate in broadcast mode and returns operating in multicast mode. The nodes 306 and 308 operate in a manner similar to the node 302.

Figure 4:
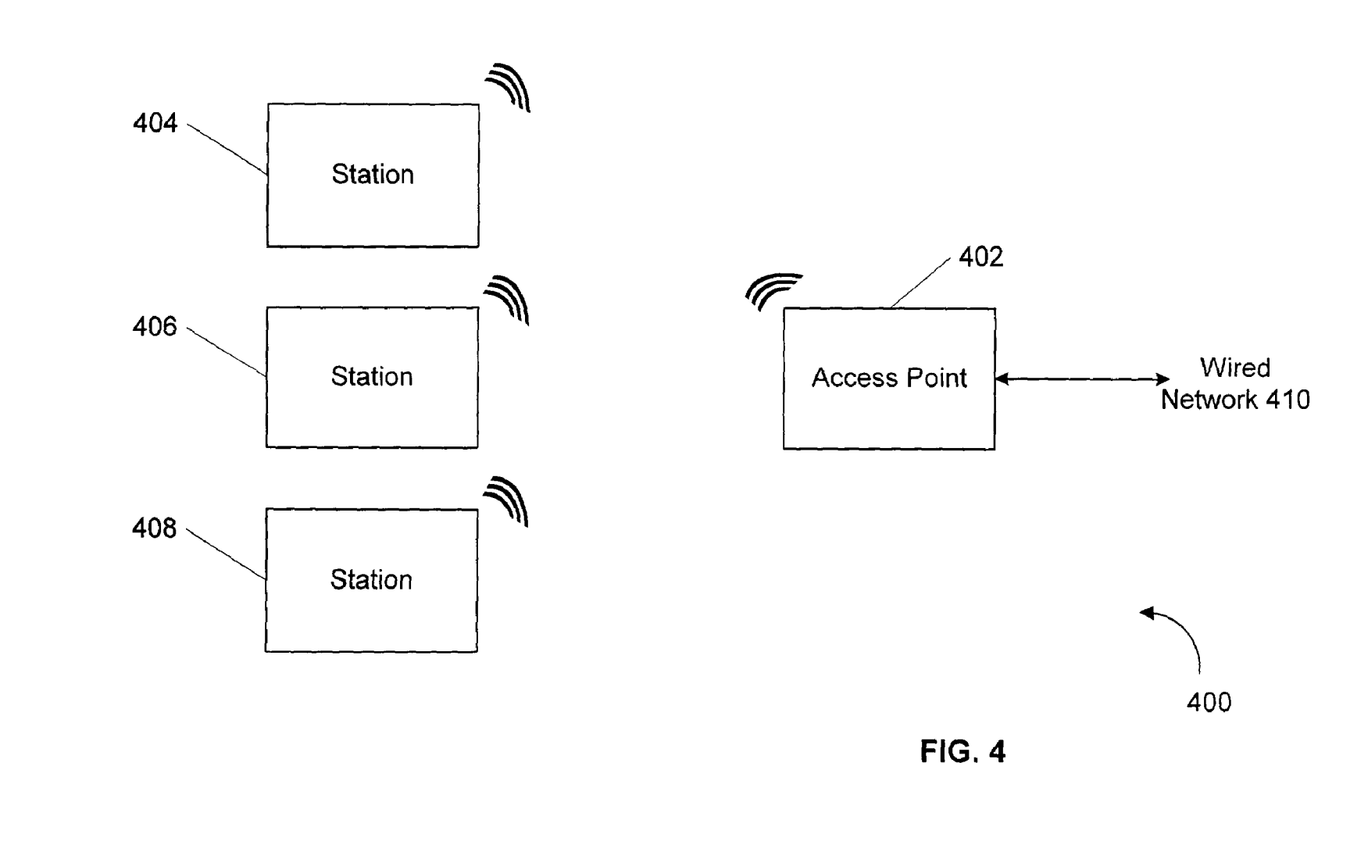
FIG. 4 illustrates a wireless local area network, in accordance with one embodiment of the present invention.

FIG. 4 illustrates a wireless network 400 comprising an access point 402 and stations 404, 406, 408. The access point 402 may also be referred to as a base station. In one embodiment, the wireless network 400 comprises a wireless network pursuant to IEEE 802.11. The access point 402 may exchange data with a wired network 410. Pursuant to a normal, mode of operation, the access point 402 broadcasts downstream data transmissions to the stations 404-408, with each station 404-408 receiving transmitted data packets destined for it by inspecting the destination address in the header of the data packet. In access point mode, each of the stations 404-408 transmits upstream data transmissions to the access point 402 and not to the other stations 404-408. Hence, if station 404 transmits a data packet to the access point 402, the stations 406, 408 will not receive the transmitted data packet.

As discussed above, for promiscuous mode devices, it is desirable, or necessary in some applications, that the promiscuous mode device receive all data transmissions on a network. In the access point mode described above, each of the stations 404-408 does not receive data transmissions sent by other ones of the stations 404-408. Hence, if one of the stations 404-408 is operating in promiscuous mode, the ability of such a promiscuous mode station to perform its functions may be limited by not receiving data transmissions sent by other ones of the stations 404-408.

Accordingly, pursuant to one embodiment of the present invention, when individual stations 404-408 register with the access point 402, an individual station 404-408 operating in promiscuous mode sends a promiscuous mode indication to the access point 402. The promiscuous mode indication notifies the access point 402 that the registering station is operating in promiscuous mode. This promiscuous mode indication may be transmitted from the promiscuous mode station to the access point 402 during the station registration process. A station 404-408 may optionally transmit a promiscuous mode indication to the access point 402 at times outside of the station registration process.

In response to receiving a promiscuous mode indication from one of the stations 404-408, the access point 402 reconfigures its mode of operation to a broadcast mode and begins to operate in broadcast mode. In broadcast mode, the access point 402 broadcasts, or reflects, all data transmissions received from one of the stations 404-408 to all of the stations 404-408. Thus, in broadcast mode, all stations 404-408 receive all data transmissions transmitted by other stations 404-408 by virtue of the access point 402 broadcasting the same. A station 404-408 operating in promiscuous mode, therefore, will see all data transmissions, including upstream data transmissions (i.e., transmissions from stations 404-408 to the access point 402) on the network 400, when the access point 402 is operating in broadcast mode.

If the access point 402 receives a non-promiscuous mode indication from the station 404-408 that transmitted the promiscuous mode indication and has not received a promiscuous mode indication from another of the stations 404-408, the access point 402 ceases to operate in broadcast mode. In particular, by ceasing to operate in broadcast mode, the access point 402 ceases to broadcast data transmissions received from individual ones of the stations 404-408 to all of the stations 404-408. Optionally, if the access point 402 does not receive any data transmissions from the station 404-408 that transmitted the promiscuous mode indication for a predetermined amount of time, the access point 402 may also cease to operate in broadcast mode.

Figure 5:
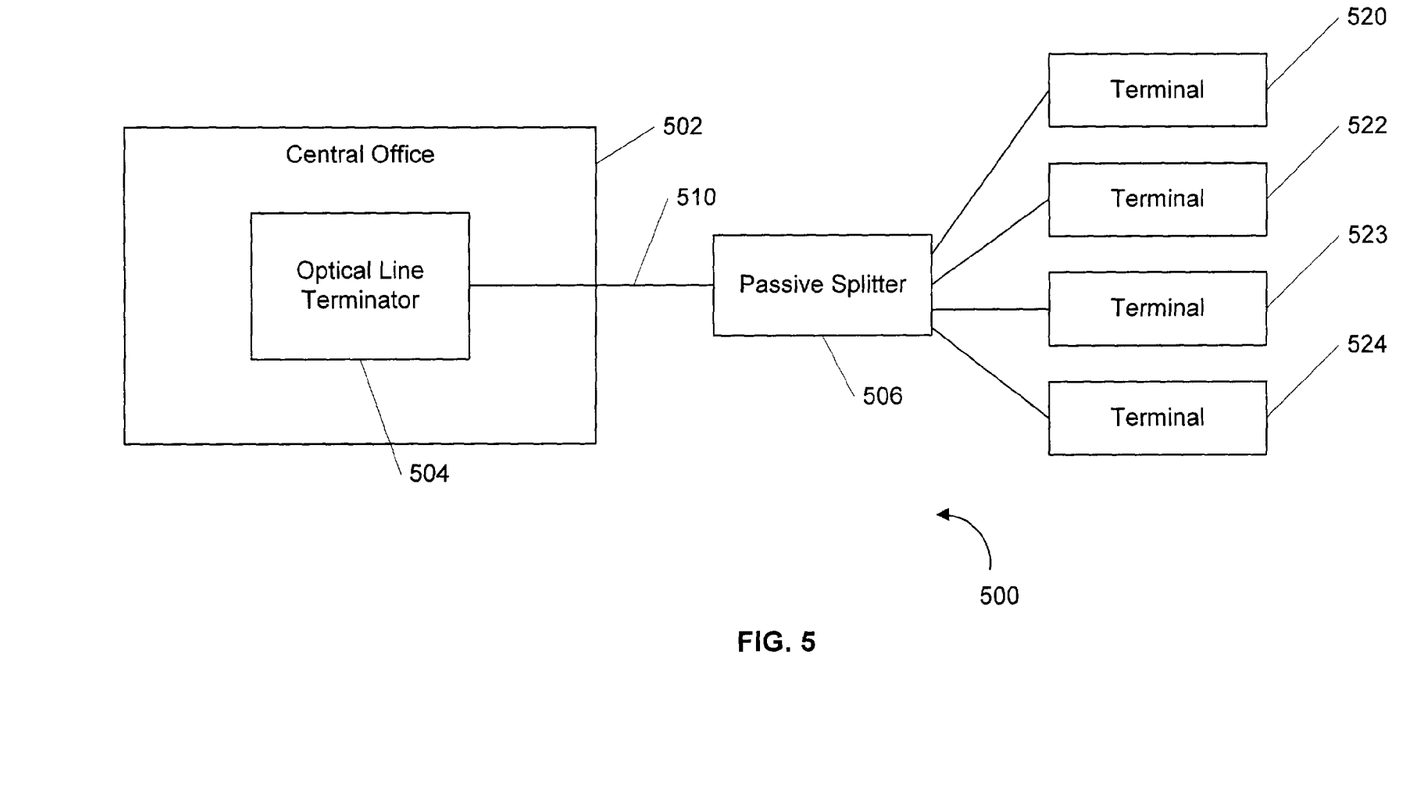
FIG. 5 illustrates a passive optical network, in accordance with one embodiment of the present invention.

FIG. 5 illustrates a passive optical network (PON) 500, such as an Ethernet PON, and includes a central office 502 having an optical line terminator (OLT) 504. The passive optical network 500 may be configured in accordance with the IEEE Draft P802.3ah/D10.0, the disclosure of which is incorporated herein by reference. The IEEE Draft P802.3ah/D1.0 may also be referred to as "Standard for—Information technology—Telecommunications and information exchange between systems—Local and metropolitan area networks—Specific requirements—Part 3: Carrier sense multiple access with collision detection (CSMA/CD) access method and physical layer specifications—Media Access Control Parameters, Physical Layers and Management Parameters for subscriber access networks."

The optical line terminator is connected to a passive splitter 506 by optical fiber 510, such as single-mode fiber. The passive splitter 506 is connected to terminals 520, 522, 523, and 524, which comprise optical network terminals (ONTs). In the network 500, downstream data is broadcast from the optical line terminator 504 along the fiber 510 and the passive splitter 506 to each of the terminals 520-524. Each of the terminals 520-524 receives packets destined for it by inspecting the address of the packet header.

Upstream data, however, is not broadcast in the network 500. Rather, upstream data transmitted from each terminal 520-524 is transmitted via the passive splitter 506, which forwards the data to the optical line terminator 504. Accordingly, not all of the terminals 520-524 see upstream data transmissions when the optical line terminator 504 operates in normal mode.

Hence, pursuant to one embodiment of the present invention, if one of the terminals 520-524 is operating in promiscuous mode, the promiscuous mode terminal transmits a promiscuous mode indication to the optical line terminator 504. The promiscuous mode terminal may transmit the promiscuous mode indication pursuant to a link layer protocol. In one embodiment, the promiscuous mode indication comprises a data packet having at least one bit set to indicate that the transmitting device is operating in promiscuous mode. The promiscuous mode indication informs the optical line terminator 504 that a promiscuous mode device is on the network 500.

In response to receiving a promiscuous mode indication from one of the terminals 520-524, the optical line terminator 504 dynamically reconfigures its mode of operation to a broadcast mode and begins to operate in broadcast mode. In broadcast mode, the optical line terminator 504 reflects, or broadcasts, all data transmissions received from one of the terminals 520-524 downstream to all of the terminals 520-524 to broadcast the received data transmission to all of the terminals 520-524. Thus, in broadcast mode, all terminals 520-524 receive all upstream data transmissions by virtue of the optical line terminator 504 reflecting the same. A terminal 520-524 operating in promiscuous mode will thus see all data transmissions, including upstream data transmissions on the network 500, when the optical line terminator 504 is operating in broadcast mode.

When a terminal 520-524 is configured or reconfigured to operate in non-promiscuous mode, the terminal 520-524 transmits a non-promiscuous mode indication to the optical line terminator 504 to signal that the transmitting node is not operating in, or no longer operating in, promiscuous mode. This non-promiscuous mode indication may comprise a data packet with a bit set to indicate that the transmitting node is not operating in promiscuous mode.

Accordingly, when the optical line terminator 504 receives a non-promiscuous mode indication from the terminal 520-524, the optical line terminator determines that the terminal 520-524 previously sent a promiscuous mode indication. If the optical line terminator 504 has not received a promiscuous mode indication from another device on the network, the optical line terminator 504 ceases to operate in broadcast mode and returns operating in multicast mode and reverts to not reflecting received upstream data transmissions. Optionally, if the optical line terminator 504 does not receive a data transmission message from any the terminal 520-524 that sent the previous promiscuous mode indication for a predetermined amount of time, the optical line terminator 504 ceases to operate in broadcast mode by ceasing to reflect received upstream data transmissions to the terminals 520-524.

Figure 6:
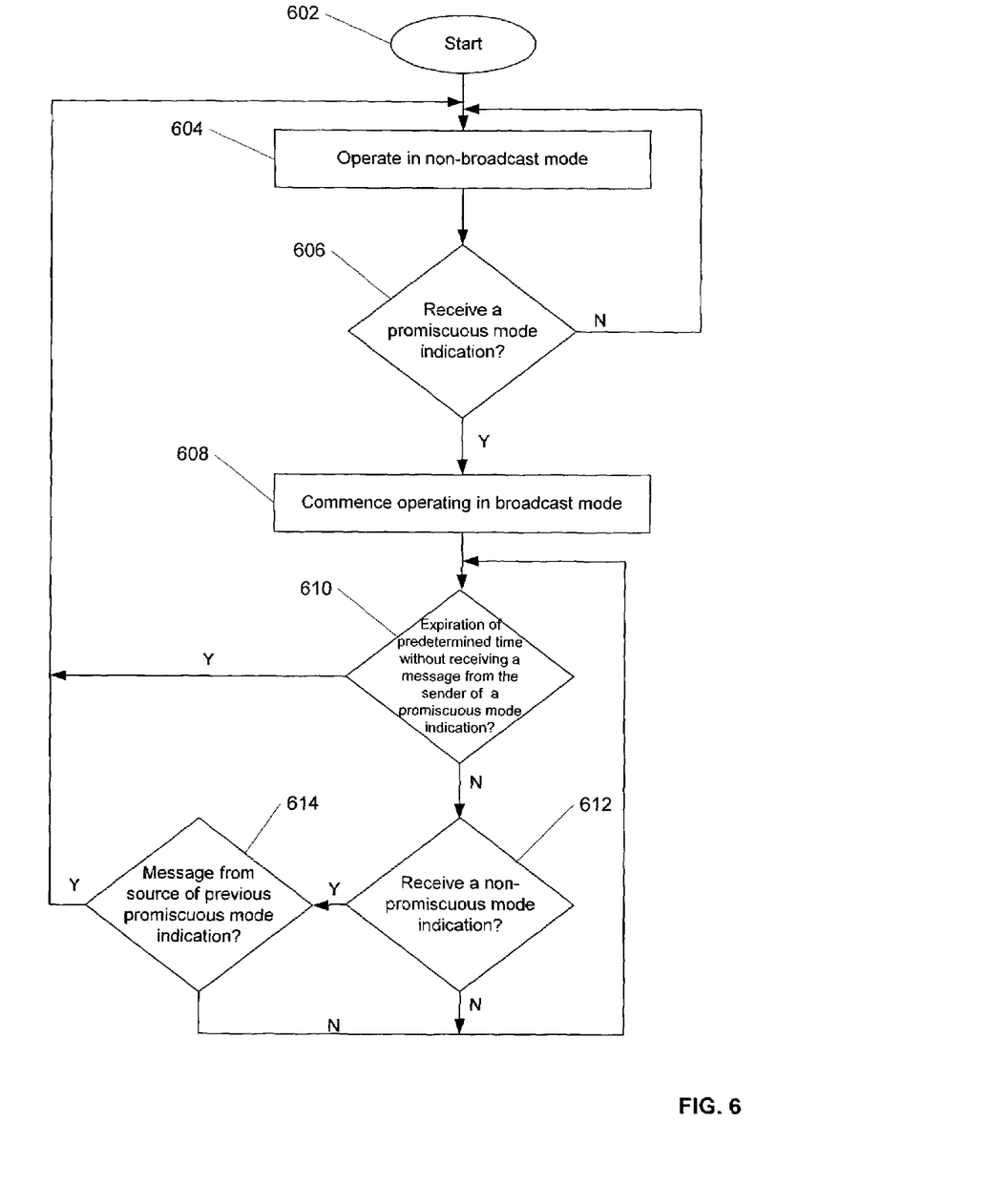
FIG. 6 illustrates a flowchart illustrating a method in accordance with one embodiment of the present invention.

FIG. 6 illustrates a flowchart 600 illustrating a method in accordance with one embodiment of the present invention. The method starts at block 602 and execution proceeds to 604 wherein a network device operates in non-broadcast mode by transmitting data packets to fewer than all devices on the network or sub-network. With reference to the network 200 (FIG. 2), the switching hub 230 operates in non-broadcast mode by not forwarding data transmissions between PCs 222 and 224 to the bridge 206. With reference to the network 300 (FIG. 3), the node 302 operates in non-broadcast mode by performing destination stripping. With reference to the network 400 (FIG. 4), the access point 402 operates in non-broadcast mode by not broadcasting, or reflecting, upstream data transmissions received from individual stations 404-408 to all the stations 404-408. With reference to the network 500, the optical line terminator 504 operates in non-broadcast mode by not broadcasting, or reflecting, upstream data transmissions received from individual terminals 520-524 to all the terminals 520-524.

Next, at block 606, a network device determines whether it has received a promiscuous mode indication from another of the network devices that is operating in promiscuous mode. As discussed above, the network device that is operating in promiscuous mode may comprise a bridge, a network monitor, or the like. Pursuant to some embodiments, the promiscuous mode indication is transmitted according to a link layer protocol for the network. If the network device determines that it has received a promiscuous mode indication from another of the network devices, execution proceeds to block 608, else execution returns to block 604.

At block 608, the network device that received the promiscuous mode indication dynamically changes its mode of operation from non-broadcast mode to broadcast mode. With reference to the network 200 (FIG. 2), the switching hub 230 operates in broadcast mode by performing flooding, including forwarding all data transmissions on the sub-network 202 to the bridge 206. With reference to the network 300 (FIG. 3), the node 302 operates in broadcast mode by ceasing to perform destination stripping, although the node 302 may continue to perform source stripping, as discussed above. With reference to the network 400 (FIG. 4), the access point 402 operates in broadcast mode by broadcasting, or reflecting, upstream data transmissions received from individual stations 404-408 to all the stations 404-408. With reference to the network 500, the optical line terminator 504 operates in broadcast mode by broadcasting, or reflecting upstream data transmissions received from individual terminals 520-524 to all the terminals 520-524.

For many network devices, commencing operating in broadcast mode 608 includes dynamically reconfiguring a MAC of the network device from operating in non-broadcast mode to broadcast mode in response to receiving the promiscuous mode indication. Execution then proceeds to block 610.

At block 610, the network device operating in broadcast mode determines whether a predetermined amount of time has expired since receiving a data transmission from the source device, or sender, of the promiscuous mode indication. If such predetermined amount of time has expired, execution returns to block 604 and the network device operating in broadcasting mode returns to operating in non-broadcast mode pursuant to block 604, else execution continues to block 612. Thus, if a promiscuous mode device on the network has been shut down or otherwise removed from the network for a predetermined amount of time, the network can return to operating in non-broadcast mode and benefit from the efficiencies associated with operating in non-broadcast mode.

At block 612, the network device operating in broadcast mode determines whether it has received a non-promiscuous mode indication. As discussed above, a non-promiscuous message is a message transmitted from a device on the network indicating that the transmitting device is not operating, or no longer operating, in promiscuous mode. If the network device operating in broadcast mode determines that it has received a non-promiscuous mode indication, execution proceeds to block 614, else execution returns to block 610.

At block 614, the network device operating in broadcast mode determines whether the non-promiscuous mode indication was received from the source, or sender, of the promiscuous mode indication of block 606. If the network device operating in broadcast mode determines that the non-promiscuous mode indication was received from the source, or sender, of the promiscuous mode indication of block 606, execution proceeds to block 604. At block 604, network device operating in broadcast mode ceases to operate in broadcast mode and begins, or resumes, operating in non-broadcast mode pursuant to block 604. Else, execution returns to block 610.

Accordingly, some embodiments of the present invention provide for a promiscuous mode device on a network to signal to one or more other devices on the network that the promiscuous mode device is operating in promiscuous mode. In response to such a signal, one or more devices on the network dynamically cease operating in non-broadcast mode and dynamically commence operating in broadcast mode to ensure that the promiscuous mode device sees all data transmissions on the network or sub-network.

This disclosure provides exemplary embodiments of the present invention. The scope of the present invention is not limited by these exemplary embodiments. Numerous variations, whether explicitly provided for by this disclosure or implied by this disclosure, may be implemented by one of ordinary skill in the art in view of this disclosure.

What is claimed is:

1. A method for configuring a network including a plurality of network devices, the method comprising:
   a first network device of the plurality of network devices transmitting data transmissions over the network to fewer than all other network devices in the network, the first network device transmitting data transmissions in a non-broadcast mode;
   receiving a message at the first network device indicating that at least one other network device in the network, is operating in a promiscuous mode, the at least one other network device not receiving the data transmissions from the first network device while the first network device is in the non-broadcast mode; and
   in response to the first network device receiving the message, the first network device begins transmitting data transmissions in a broadcast mode over the network to all other network devices in the network including the at least one other network device operating in the promiscuous mode, wherein the data transmissions are in the form of data packets and the data packets are broadcast using original headers.

2. The method of claim 1, wherein the first network device is a switching hub.

3. The method of claim 1, wherein the first network device is a packet forwarding device.

4. The method of claim 1, wherein the first network device receives the message in accordance with a link layer protocol.

5. The method of claim 1, wherein the message comprises a data packet indicating that at least one network device in the network is operating in a promiscuous mode.

6. The method of claim 1, wherein the message is transmitted by the network device in the network that is operating in the promiscuous mode.

7. The method of claim 1, wherein:
   the first network device transmitting data transmissions in a non-broadcast mode further comprises the first network device performing destination stripping; and
   the first network device transmitting data transmissions in a broadcast mode further comprises the first network device ceasing to perform destination stripping.

8. The method of claim 1, wherein:
   the first network device is a switching hub; and
   the first network device transmitting data transmissions in a broadcast mode further comprises operating the switching hub as a non-switching hub.

9. The method of claim 1, wherein:
   the first network device is a learning bridge; and
   the first network device transmitting data transmissions in a broadcast mode further comprises operating the learning bridge as a non-learning bridge.

10. The method of claim 1, wherein the first network device transmitting data transmissions in a broadcast mode further comprises the first network device broadcasting-data transmissions received from one other network device to all other network devices in the network.

11. The method of claim 1, wherein the first network device is a wireless access point.

12. The method of claim 1, wherein the first network device an optical line terminator.

13. The method of claim 1, wherein the network comprises a network pursuant to IEEE 802.17.

14. A method for configuring a network including a plurality of network devices, the method comprising:
   operating a first network device of the plurality of network devices in a non-broadcast mode;
   the first network device receiving a promiscuous mode indication from another network device in the network; and
   changing a mode of operation of the first network device from the non-broadcast mode to a broadcast mode in response to the first network device receiving the promiscuous mode indication, wherein the data transmissions are in the form of data packets and the data packets are broadcast using original headers.

15. The method of claim 14, further comprising changing the mode of operation of the first network device from the broadcast mode to the non-broadcast mode after a predetermined amount of time has expired since receiving a data transmission from a sender of the promiscuous mode indication.

16. The method of claim 14, further comprising changing the mode of operation of the first network device from the broadcast mode to the non-broadcast mode in response to receiving a non-promiscuous mode indication.

17. The method of claim 14, further comprising changing the mode of operation of the first network device from the broadcast mode to the non-broadcast mode in response to receiving a non-promiscuous mode indication from a sender of the promiscuous mode indication.

18. The method of claim 14, wherein operating in non-broadcast mode further comprises transmitting data packets to fewer than all devices in a sub-network.

19. The method of claim 14, wherein operating in non-broadcast mode further comprises performing destination stripping.

20. The method of claim 14, wherein operating in non-broadcast mode further comprises not broadcasting data transmissions received from one of the other network devices to all of the other network devices.

21. The method of claim 14, wherein the changing a mode of operation of the first network device from the non-broadcast mode to a broadcast mode in response to receiving the promiscuous mode indication further comprises dynamically configuring a MAC of the first device.

22. The method of claim 14, wherein the changing a mode of operation of the first network device from the non-broadcast mode to a broadcast mode in response to receiving the promiscuous mode indication further comprises commencing to perform flooding by the first network device.

* * * * *